United States Patent
Lea

(10) Patent No.: US 11,714,956 B1
(45) Date of Patent: Aug. 1, 2023

(54) ONTOLOGY-BASED SEMANTIC RENDERING

(71) Applicant: Rakuten Mobile, Inc., Tokyo (JP)

(72) Inventor: Richard Lea, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/585,550

(22) Filed: Jan. 27, 2022

(51) Int. Cl.
 *G06F 40/143* (2020.01)
 *G06F 16/958* (2019.01)
 *G06F 40/30* (2020.01)

(52) U.S. Cl.
 CPC .......... *G06F 40/143* (2020.01); *G06F 16/986* (2019.01); *G06F 40/30* (2020.01)

(58) Field of Classification Search
 CPC ............................... G06F 40/143; G06F 40/30
 See application file for complete search history.

(56) References Cited

U.S. PATENT DOCUMENTS

| | | | |
|---|---|---|---|
| 2002/0002594 A1* | 1/2002 | Roundtree | G06Q 30/0203 709/217 |
| 2004/0012627 A1* | 1/2004 | Zakharia | G06F 16/9577 715/744 |
| 2005/0149395 A1* | 7/2005 | Henkin | G06Q 30/0247 707/E17.116 |
| 2008/0168420 A1* | 7/2008 | Sabbouh | G06F 16/972 707/E17.117 |
| 2011/0119223 A1* | 5/2011 | Lane | G06F 16/958 706/50 |
| 2013/0047075 A1* | 2/2013 | Cooney | G06F 40/143 715/234 |
| 2014/0113263 A1* | 4/2014 | Jarrell | G09B 23/28 434/262 |
| 2017/0185674 A1 | 6/2017 | Tonkin et al. | |

* cited by examiner

*Primary Examiner* — Keith D Bloomquist
(74) *Attorney, Agent, or Firm* — Hauptman Ham, LLP

(57) ABSTRACT

Ontology-based semantic rendering is performed by retrieving a rendering script from a location represented by an ontology reference of a concept of content included in a document, the document further including an ontology dataset identifier of the concept and the ontology reference, and rendering the concept of content according to the rendering script and a mode of rendering represented by a rendering device.

20 Claims, 10 Drawing Sheets

```
318
<html>
<head>
<script src="render.js">
</script>
</head>
 <body onLoad="render(       382        380A
    ontology: 'giraffe.owl',
    content:  'http://render-scripts.org/southern-giraffe',
              'http://render-scripts.org/northern-giraffe'
  )">  384
    <iframe src="render.html">      380B
    </iframe>
 </body>
</html>
```

*FIG. 3*

```xml
<?xml version="1.0" encoding="UTF-8"?>
<rdf:RDF
    xmlns:rdf="http://www.w3.org/1999/02/22-rdf-syntax-ns#"
    xmlns:rdfs="http://www.w3.org/2000/01/rdf-schema#"
    xmlns:owl="http://www.w3.org/2002/07/owl#"
    xmlns:xsd="http://www.w3.org/2001/XMLSchema#">     483
    xmlns:ontology="http://public.org/general-ontology#"> 481A
    <owl:Ontology rdf:about="xml:base" />
    <owl:Class
    rdf:resource="http://render-scripts.org/southern-giraffe">
        <rdfs:comment>The southern giraffe is a species of giraffe
            in southern Africa.
        </rdfs:comment>                              486
        <rdfs:subClassOf
        rdf:resource="http://render-scripts.org/giraffe" />
    </owl:Class>

<owl:Class
    rdf:resource="http://render-scripts.org/northern-giraffe">
        <rdfs:comment>The northern giraffe is a species of giraffe
            in northern Africa.
        </rdfs:comment>                              486
        <rdfs:subClassOf
        rdf:resource="http://render-scripts.org/giraffe" />
    </owl:Class>
</rdf:RDF>
     481B                                          415A
```

*FIG. 4A*

```xml
<?xml version="1.0" encoding="UTF-8"?>
<rdf:RDF
  xmlns:rdf="http://www.w3.org/1999/02/22-rdf-syntax-ns#"
  xmlns:rdfs="http://www.w3.org/2000/01/rdf-schema#"
  xmlns:owl="http://www.w3.org/2002/07/owl#"
  xmlns:xsd="http://www.w3.org/2001/XMLSchema#">
  <owl:Ontology rdf:about="xml:base" />
  ⋮
  <owl:Class rdf:resource="http://render-scripts.org/giraffe">
    <rdfs:comment>
      Giraffes are herbivores, and they eat only leaves.
    </rdfs:comment>
    <rdfs:subClassOf
    rdf:resource="http://render-scripts.org/herbivore" />
  </owl:Class>
  ⋮
  <owl:Class rdf:resource="http://render-scripts.org/herbivore">
    <rdfs:comment>
      Herbivores are animals that eat only plants.
    </rdfs:comment>
    <rdfs:subClassOf
    rdf:resource="http://render-scripts.org/animal" />
  </owl:Class>
```

*FIG. 4B*

ONTOLOGY-BASED SEMANTIC RENDERING

BACKGROUND

Many devices are programmed to render content that is retrieved from the Internet. Many web pages are coded with Hypertext Markup Language (HTML), which is a format from which a device renders the content in a specified manner. The content of many web pages include strings of natural language among the coded portions. Many devices will render such strings without conversion or transformation of the characters of the string.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a document including concepts of content, according to at least some embodiments of the present invention.

FIG. 4A is a portion of a specialized ontology dataset 415A, according to at least some embodiments of the present invention.

FIG. 4B is a portion of a general ontology dataset, according to at least some embodiments of the present invention.

DETAILED DESCRIPTION

Figure 1:
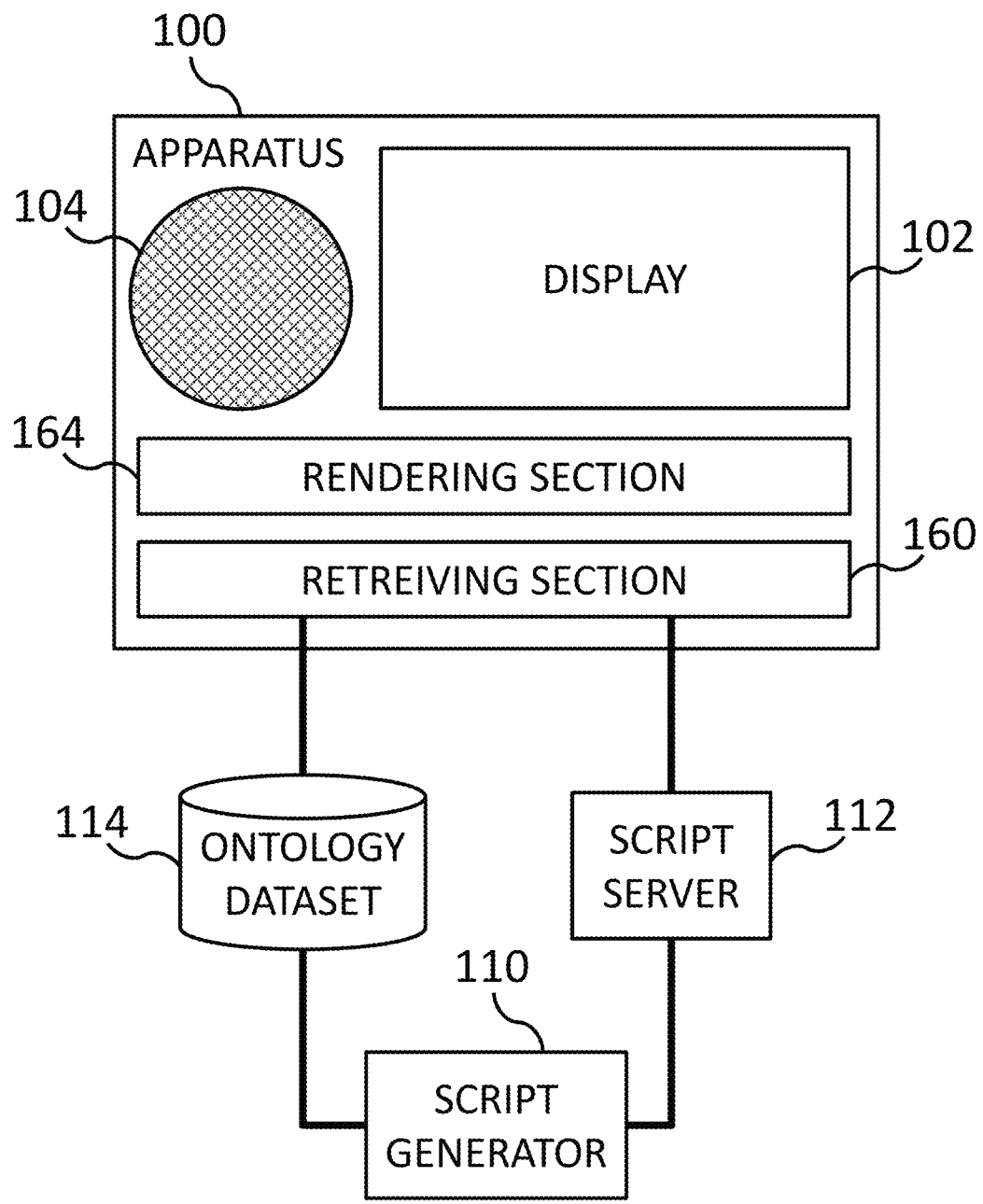
FIG. 1 is a schematic diagram of a system for ontology-based semantic rendering, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

To render strings of natural language in a transformative manner, such as rendering an image based on a text description of the image, some devices employ natural language processing, which is a machine learning technique used to interpret a natural language string in a manner that establishes meaning of the concepts in the string, and of the string as a whole. Using natural language processing, a device is able to render a natural language string in manner that converts the string into an image, sound, etc.

Results of natural language processing and other machine learning techniques are influenced by the quality of the content of the string, and are subject to inaccuracy from a string creator's biases, missing values and typos, and general ambiguity. Success of natural language processing is credited to algorithms more than adherence of content to a specific architecture or data-structure. Natural language processing initially maps all data into number frames, which reduces ways to define and classify the data, and also reduces human interpretability of the result.

Instead of unstructured natural language, some webpages include structured text among the content, such as a data string with concepts selected from a universal ontology of concepts, or a publicly accessible vocabulary. An ontology of concepts specifies a vocabulary, each concept defined by relationship to other concepts, such as class and subclass relationships. However, maintaining and adhering to a centralized complete vocabulary forces concepts to be used in a single context, which is complicated by the existence of homographs.

In a project and development context, semi-structured text, in which some concepts are defined by a defined vocabulary, and overall interpretation is assisted by machine learning, is employed to describe product scope, requirements, features, user stories, schedules, and other content types. User Story is a form of semi-structured text used across project and development context. User Story is used for limited vocabularies, such as vocabularies limited to a specific project, and by those who are familiar with the technical concepts and knowledge of the vocabulary.

Documents, such as web pages, are recognized and rendered based on complex and inexact logic, such as natural language processing, or a limited set of exact rules, such as structured or semi-structured text.

At least some embodiments herein include a modular system for specifying rules of recognition and rendering such that generic rules can be followed by default, and context-specific rules can be created and followed where specified. In at least some embodiments, devices are configured to retrieve executable scripts based on ontology information within a document to be rendered and also ontology information outside of the document, and to execute the scripts to render the document according to one or more modes specified by the device or a user thereof.

In a project and development context, at least some embodiments herein include integrating knowledge of each subdivision of a project onto one structured ontology when organizing the project context and histories. When a user organizes a project context and histories into a project ontology featured with devices and methods of at least some embodiments herein, the project ontology assists user searches, reasoning, and scheduling requirements within the project ontology. Users organize knowledge with links that are represented and reasoned through formal logic that represents statements and argument patterns symbolically, with reduced ambiguity compared to natural language processing in at least some embodiments herein. In accordance with at least some embodiments herein, once organized, project knowledge shared through data in the ontology format and shown to different people is renderable according to the context specified by the rendering device. In accordance with at least some embodiments herein, knowledge sharing involving confidential projects, communication between internal employees and outsourced personnel becomes more controllable, maintainable, and comprehensible.

FIG. 1 is a schematic diagram of a system for ontology-based semantic rendering, according to at least some embodiments of the present invention. The system includes an apparatus 100, a script generator 110, a script server 112, and an ontology dataset 114. Apparatus 100, script generator 110, script server 112, and ontology dataset 114 are in communication through a network, such as the Internet, a local area network, etc., or a combination thereof.

In at least some embodiments, script generator 110 is a computer, such as a desktop computer, notebook computer, handheld computer, etc. In at least some embodiments, script generator 110 is configured to generate scripts for rendering concepts in response to receiving user commands input thereto. In at least some embodiments, script generator 110 is a server, a plurality of servers, or a portion of a server, a virtual instance of cloud computing, etc. In at least some embodiments, script generator 110 is configured to auto-generate scripts for rendering concepts in response to pre-determined criteria. In at least some embodiments, script generator 110 is configured to transmit and store rendering scripts on script server 112. In at least some embodiments, script generator 110 is configured to create a new concept or modify an existing concept in ontology dataset 114 with a reference to the rendering script stored in script server 112.

In at least some embodiments, script server 112 stores rendering scripts associated with each concept in ontology dataset 114. In at least some embodiments, script server 112 stores rendering scripts associated with less than all concepts in ontology dataset 114. In at least some embodiments, script server 112 is a server, a plurality of servers, or a portion of a server, a virtual instance of cloud computing, etc. In at least some embodiments, script server 112 is configured to receives and store rendering scripts, and to transmit rendering scripts upon request.

In at least some embodiments, ontology dataset 114 is a dataset of concepts in association with each other, such as defined by classes and sub-classes. In at least some embodiments, each concept in ontology dataset 114 is associated with a class, a sub-class, and a reference to a rendering script. In at least some embodiments, the reference to a rendering script is a network location of the rendering script on a server, such as script server 112. In at least some embodiments, ontology dataset 114 includes an entire dictionary of concepts. In at least some embodiments, ontology dataset 114 includes a set of context-specific concepts. In at least some embodiments, ontology dataset 114 is stored on a computer-readable memory. In at least some embodiments, ontology dataset 114 is stored on a computer, a server, a database server, a plurality of servers, or a portion of a server, a virtual instance of cloud computing, etc. In at least some embodiments, ontology dataset 114 is accessible through the computer or server to rendering devices for download as a whole, or reference to particular concept or set of concepts. In at least some embodiments, ontology dataset 114 is a publicly accessible vocabulary provider, such as https://schema.org. In some embodiments, a modular system for ontology-based semantic rendering includes more than one ontology dataset, each ontology dataset including a different set of concepts.

Apparatus 100 is configured to render content of documents. In at least some embodiments, apparatus 100 is a computer, such as a desktop computer, notebook computer, handheld computer, etc. In at least some embodiments, apparatus 100 includes an application execution environment, such as an operating system, and executes a browser application for ontology-based semantic rendering. In at least some embodiments, apparatus 100 is an Internet-of-Things (IoT) computing device, such as a watch, a camera, a speaker, a light, or anything else capable of receiving information through a network and performing operations on the basis of the received information.

Apparatus 100 includes a display 102, a speaker 104, a retrieving section 160, and a rendering section 164. In at least some embodiments, display 102 is configured to produce an image according to signals received by display 102. In at least some embodiments, display 102 is a Liquid Crystal Display (LCD) or any other electronic screen. In at least some embodiments, speaker 104 is configured to produce sound waves according to signals received by speaker 104. In at least some embodiments, speaker 104 is an electrodynamic loudspeaker, flat panel speaker, or any other electronic speaker. In at least some embodiments, retrieving section 160 and rendering section 164 are part of a controller configured to perform logical operations. In at least some embodiments, retrieving section 160 is configured to retrieve rendering scripts from script server 112, concept information from ontology dataset 114, documents from various locations, etc. In at least some embodiments, rendering section 164 is configured to render documents through at least one of display 102 or speaker 104.

In at least some embodiments, one or more of the script generator, script server, and ontology dataset are part of the same computer or server. In at least some embodiments, one or more of the apparatus, script generator, script server, and ontology dataset are within a local area network while others are outside of the local area network, yet still connected through a common wide area network, such as the Internet.

Figure 2:
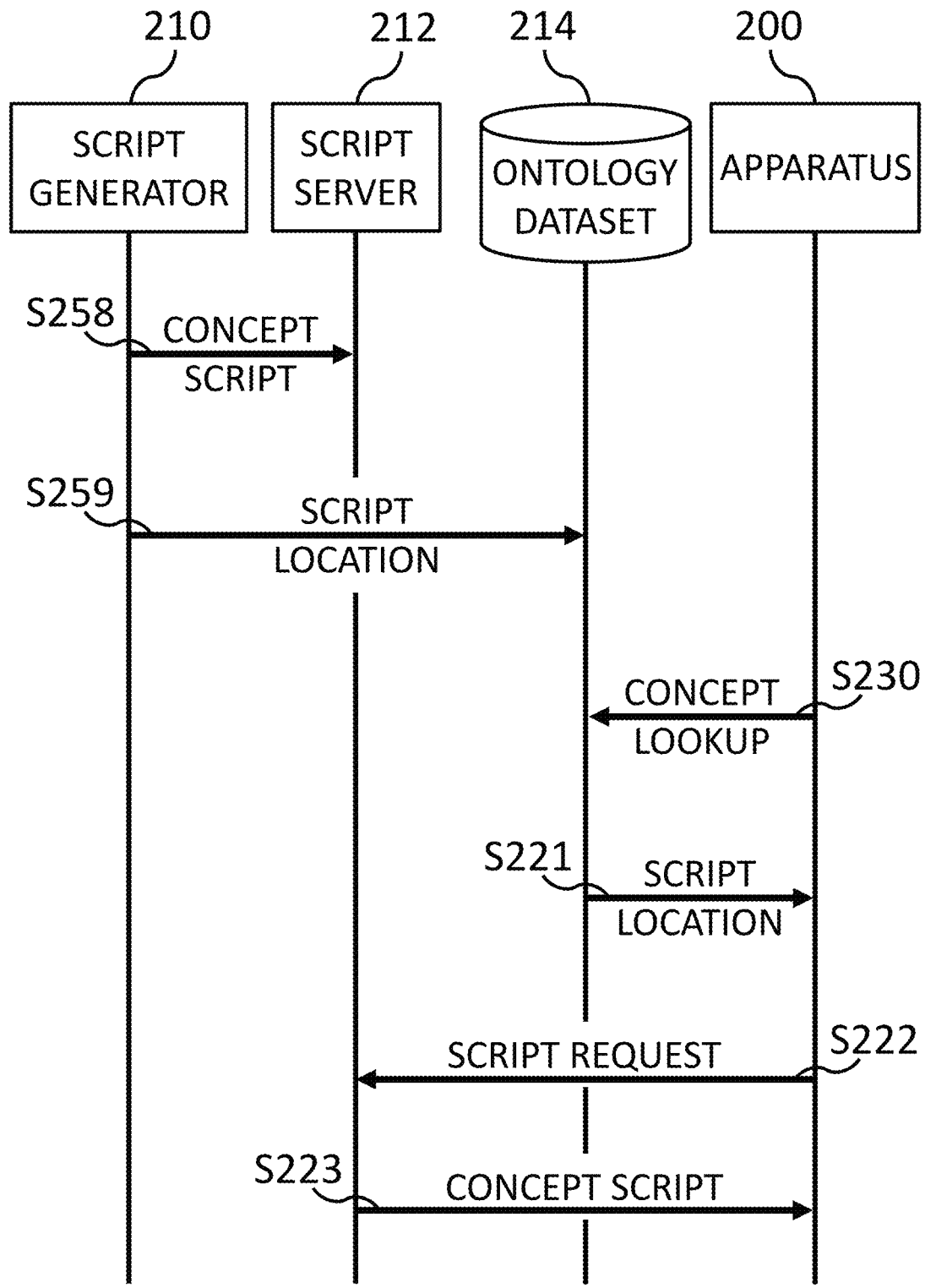
FIG. 2 is a communication flow for ontology-based semantic rendering, according to at least some embodiments of the present invention.

FIG. 2 is a communication flow for ontology-based semantic rendering, according to at least some embodiments of the present invention. The communication flow is conducted to perform a process of ontology-based semantic rendering. In at least some embodiments, the communication flow is conducted among a script generator 210, a script server 212, an ontology dataset 214, and an apparatus 200.

At S258, script generator 210 transmits a rendering script for a concept to script server 212. In at least some embodiments, script generator 210 transmits the rendering script across a network to script server 212.

At S259, script generator 210 transmits a network location of the rendering script to ontology dataset 214. In at least some embodiments, script generator 210 creates a new concept in ontology dataset 214 including a class, a subclass, and the script location. In at least some embodiments, script generator 210 modifies an existing concept in ontology dataset 214 to include the script location.

At S230, apparatus 200 accesses ontology dataset 214 for a concept lookup. In at least some embodiments, apparatus 200 retrieves information for a concept including a class, a subclass, and a script location. In at least some embodiments, apparatus 200 retrieves the information for the concept along with information for all other concepts in ontology dataset 214 at once. In at least some embodiments, apparatus 200 performs the concept lookup in response to receiving an instruction to render a document including a reference to a concept in ontology dataset 214.

At S221, ontology dataset 214 transmits the script location to apparatus 200. In at least some embodiments, ontology dataset 214 performs the transmission in response to the concept lookup by apparatus 200. In at least some embodiments, ontology dataset 214 also transmits other information associated with the concept, such as class and subclass information.

At S222, apparatus 200 requests a rendering script from script server 212. In at least some embodiments, apparatus 200 transmits a request for the rendering script to the network location received at S221.

At S223, script server 212 transmits a rendering script for the concept to apparatus 200. In at least some embodiments, script server 212 performs the transmission in response to the script request received at S222.

FIG. 3 is a document 318 including concepts of content, according to at least some embodiments of the present invention. Document 318 includes data of an ontology reference 380A, an ontology reference 380B, an ontology dataset identifier 382, and a content 384. In at least some embodiments, the data in document 318 is in HTML format.

Ontology references 380A and 380B each represent an entry in an ontology dataset. In at least some embodiments, ontology reference 380A represents an entry in a general ontology dataset applicable to all concepts of content 384. In at least some embodiments, ontology reference 380A provides information used to locate the entry in one or more ontology datasets, such as an ontology dataset identified by ontology dataset identifier 382. In at least some embodiments, ontology reference 380A also provides information used to locate a rendering script. Ontology reference 380A reads "http://render-scripts.org/southern-giraffe" because ontology reference 380A functions as both a representation of an entry in an ontology dataset and a location of a rendering script.

Ontology dataset identifier 382 identifies the ontology dataset that includes entries for the concepts of content 384. In at least some embodiments, ontology dataset identifier 382 is a location of a local computing system, a location in an intranet, a remote location, etc. Ontology dataset identifier 382 reads "giraffe.owl" because ontology dataset identifier 382 is a location of a local computing system. In at least some embodiments, ontology dataset identifier 382 represents one of a general ontology dataset and a specialized ontology dataset.

Content 384 includes a plurality of concepts. In at least some embodiments, document 318 represents content 384 as being renderable by a rendering device. In at least some embodiments, the data of document 318 includes ontology references of one or more concepts within content 384. The data in document 318 includes ontology reference 380A, which corresponds to the concept of a southern giraffe. The data in document 318 includes ontology reference 380B, which corresponds to the concept of a northern giraffe.

FIG. 4A is a portion of a specialized ontology dataset 415A, according to at least some embodiments of the present invention. Specialized ontology dataset 415A includes data describing a subclass 481A and a subclass 481B. The data describing each subclass includes ontology reference 486. Both subclass 481A and subclass 481B are subclasses of ontology reference 486. In at least some embodiments, the data in specialized ontology dataset 415A is in Extensible Markup Language (XML) format. In at least some embodiments, the data in specialized ontology dataset 415A conforms to Resource Description Framework (RDF). In at least some embodiments, the data in specialized ontology dataset 415A further conforms to Web Ontology Language (OWL). The data in specialized ontology dataset 415A further includes ontology dataset identifier 483. Ontology dataset identifier 483 identifies a higher level ontology dataset that includes entries for classes corresponding to the subclasses in specialized ontology dataset 415A. In at least some embodiments, ontology dataset identifier 483 is a location of a local computing system, a location in an intranet, a remote location, etc. Ontology dataset identifier 483 reads "http://public.org/general-ontology#" because ontology dataset identifier 483 is a remote location.

In at least some embodiments, the data in specialized ontology dataset 415A includes semantic data, denoted by an Internationalized Resource Identifier (IRI), for one or more concepts of content. The concept of subclass 481A has an IRI of "http://render-scripts.org/southern-giraffe". The concept of subclass 481B has an IRI of "http://render-scripts.org/northern-giraffe". In at least some embodiments, the semantic data in specialized ontology dataset 415A is compatible with all features in JavaScript Object Notation for Linking Data (JSON-LD) format. In at least some embodiments, the data in specialized ontology dataset 415A further establishes a base IRI. In at least some embodiments, the base IRI is established in the context of specialized ontology dataset 415A, or is based on a location of specialized ontology dataset 415A. In at least some embodiments, the base IRI relates relative IRI references to IRIs. In at least some embodiments, an IRI is a string representing a scheme along with a path and an optional query and fragment segments. In at least some embodiments, two IRIs are equal if and only if the two IRIs are equivalent under Simple String Comparison according to RFC3987. In at least some embodiments, normalization is not performed when comparing IRIs for equality. In at least some embodiments, an IRI reference denotes the common usage of an IRI. In at least some embodiments, an IRI reference may be absolute or relative. In at least some embodiments, an IRI that results from an IRI reference is an absolute IRI, even if the IRI reference is relative.

The data in specialized ontology dataset 415A represents subclass 481A, which corresponds to the concept of a southern giraffe, and represents subclass 481B, which corresponds to the concept of a northern giraffe. The data in specialized ontology dataset 415A describing subclasses 481A and 481B further indicates ontology reference 486, which corresponds to the concept of a giraffe. Ontology reference 486 reads "http://render-scripts.org/northern-giraffe" because ontology reference 486 functions as both a representation of an entry in an ontology dataset and a location of a rendering script. The data in specialized ontology dataset 415A designates each of subclasses 481A and 481B as a "class" and as a "subclass of" ontology reference 486. Thus, the relationship between giraffe and southern giraffe is class and subclass, respectively. In other words, a southern giraffe is a type of giraffe.

FIG. 4B is a portion of a general ontology dataset 415B, according to at least some embodiments of the present invention. General ontology dataset 415B includes data describing class 485 and class 487. The data describing class 485 includes ontology reference 488. Class 485 is a subclass of ontology reference 488. The data describing class 487 includes ontology reference 489. Class 487 is a subclass of ontology reference 489. In at least some embodiments, the data in general ontology dataset 415B is in XML format. In at least some embodiments, the data in general ontology dataset 415B conforms to RDF. In at least some embodiments, the data in general ontology dataset 415B further conforms to OWL. In at least some embodiments, the data in general ontology dataset 415B further conforms to XML schema.

In at least some embodiments, the data of general ontology dataset 415B represents classes and sub-classes of a vocabulary of concepts for use with content in general. The data in general ontology dataset 415B describes class 485, which corresponds to the concept of a giraffe". The data in general ontology dataset 415B describing class 485 further indicates ontology reference 488, which corresponds to the concept of an herbivore. Ontology reference 488 reads "http://render-scripts.org/herbivore" because ontology reference 488 functions as both a representation of an entry in an ontology dataset and a location of a rendering script. The data in general ontology dataset 415B further describes class 487, which corresponds to the concept of an herbivore. The data in general ontology dataset 415B describing class 487 further indicates ontology reference 489, which corresponds to the concept of an animal. Ontology reference 488 reads "http://render-scripts.org/herbivore" because ontology reference 488 functions as both a representation of an entry in an ontology dataset and a location of a rendering script. In at least some embodiments, the data in general ontology dataset 415B represents a vocabulary, and each class is identified by an IRI.

Figure 5:
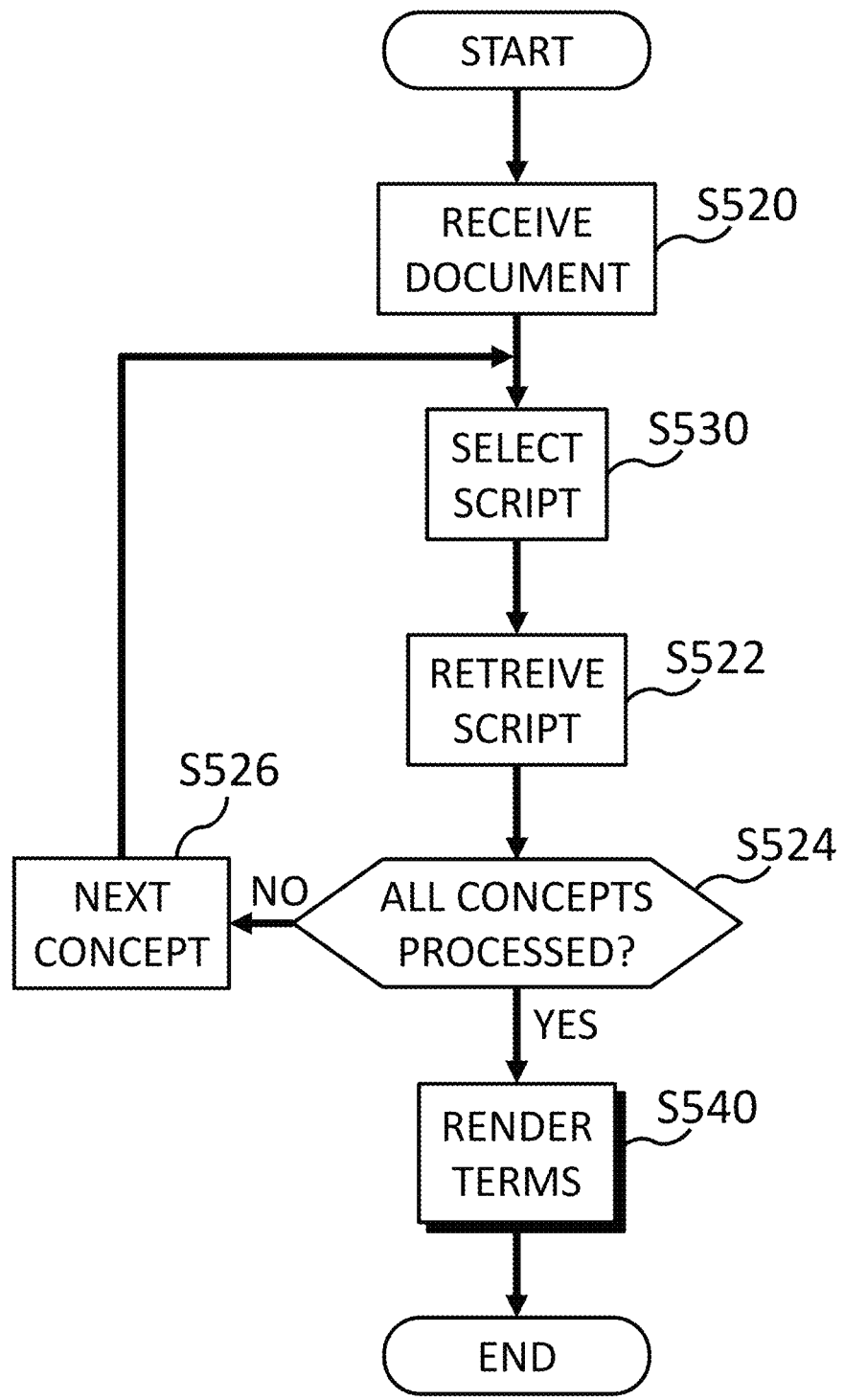
FIG. 5 is an operational flow for ontology-based semantic rendering, according to at least some embodiments of the present invention.

FIG. 5 is an operational flow for ontology-based semantic rendering, according to at least some embodiments of the present invention. The operational flow provides a method of ontology-based semantic rendering. In at least some embodiments, one or more operations of the method are executed by a controller of an apparatus including sections for performing certain operations, such as the controller and apparatus shown in FIG. 9, which will be explained hereinafter.

At S520, a retrieving section or a sub-section thereof receives a document. In at least some embodiments, the retrieving section retrieves a document including a concept of content, an ontology reference of the concept, and an ontology dataset identifier, such as document 318 of FIG. 3. In at least some embodiments, the retrieving section receives the document in response to signals received from an input. In at least some embodiments, the retrieving section receives the document as part of an automated routine.

Figure 6:
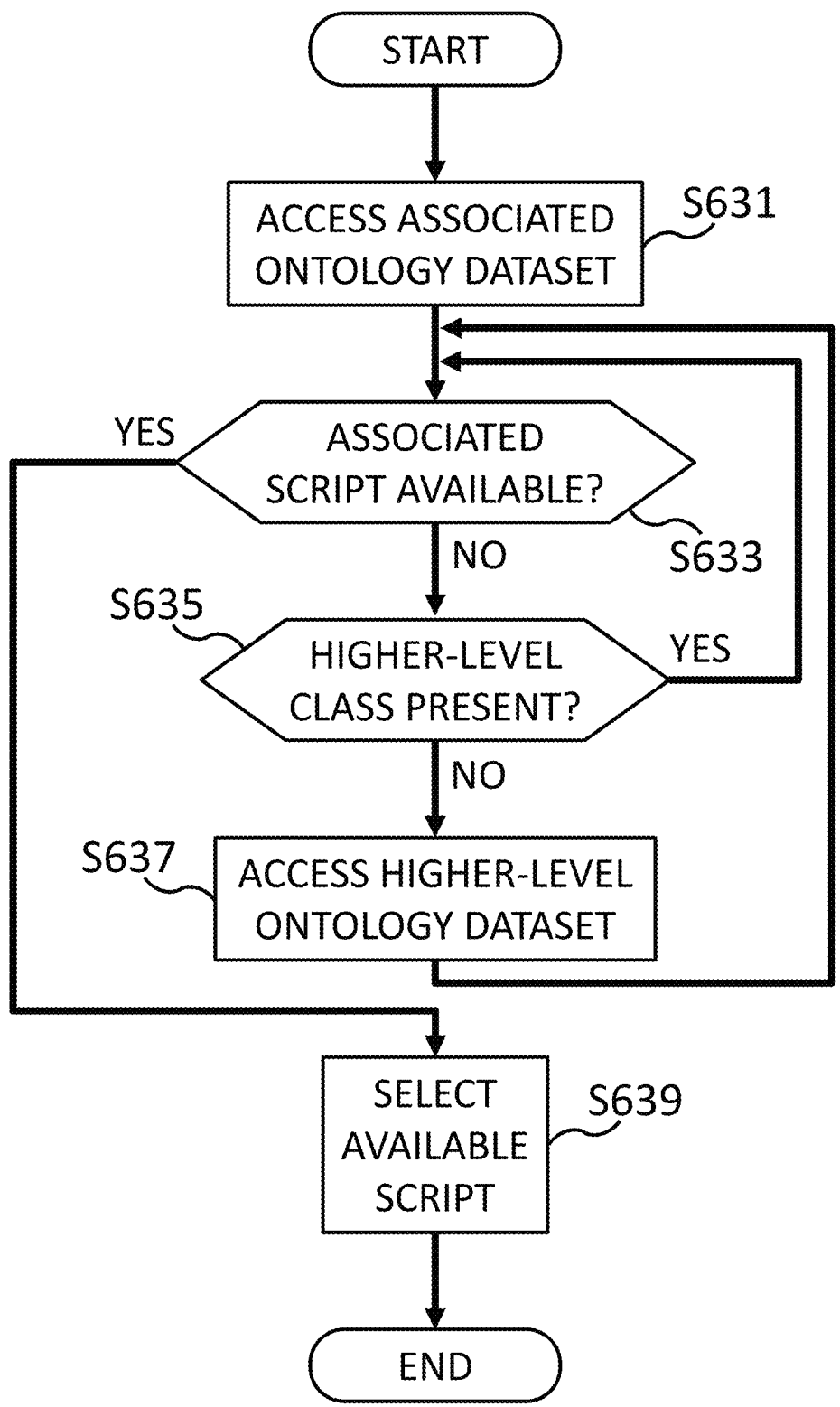
FIG. 6 is an operational flow for selecting a script, according to at least some embodiments of the present invention.

At S530, a selecting section or a sub-section thereof selects a rendering script for a concept of content in the document. In at least some embodiments, the selecting section selects the rendering script to render the concept of content based on the ontology reference and the ontology dataset identifier. In at least some embodiments, the script selection proceeds as shown in FIG. 6, which will be explained hereinafter. As iterations of S530 proceed, the selecting section selects rendering script for the concepts in the content of the document received at S520. In at least some embodiments with the example document 318 of FIG. 3, the selecting section identifies at least the concepts of southern giraffe and northern giraffe from among the concepts in content 384, and the operational flow includes an iteration of the operations at S530 and S522 for each identified concept.

At S522, the retrieving section or a sub-section thereof retrieves a rendering script. In at least some embodiments, the retrieving section retrieves a rendering script from a location represented by the ontology reference. In at least some embodiments, the retrieving section retrieves the rendering script selected at S530. In at least some embodiments, the retrieving section retrieves a rendering script from a location represented in the document in association with the concept or represented in an ontology dataset in association with the class. In at least some embodiments with the example document 318 of FIG. 3, the retrieving section retrieves a rendering script of FIG. 4B at least for the concept of giraffe.

At S524, the controller or a section thereof determines whether all of the concepts have been processed. In at least some embodiments, the controller determines whether all of the concepts of content in the document received at S520 have been processed. If the controller determines that all of the concepts have been processed, then the operational flow proceeds to concept rendering at S540. If the controller determines that unprocessed concepts remain, then the operational flow returns to script selection at S530 after selecting the next concept (S526).

Figure 7:
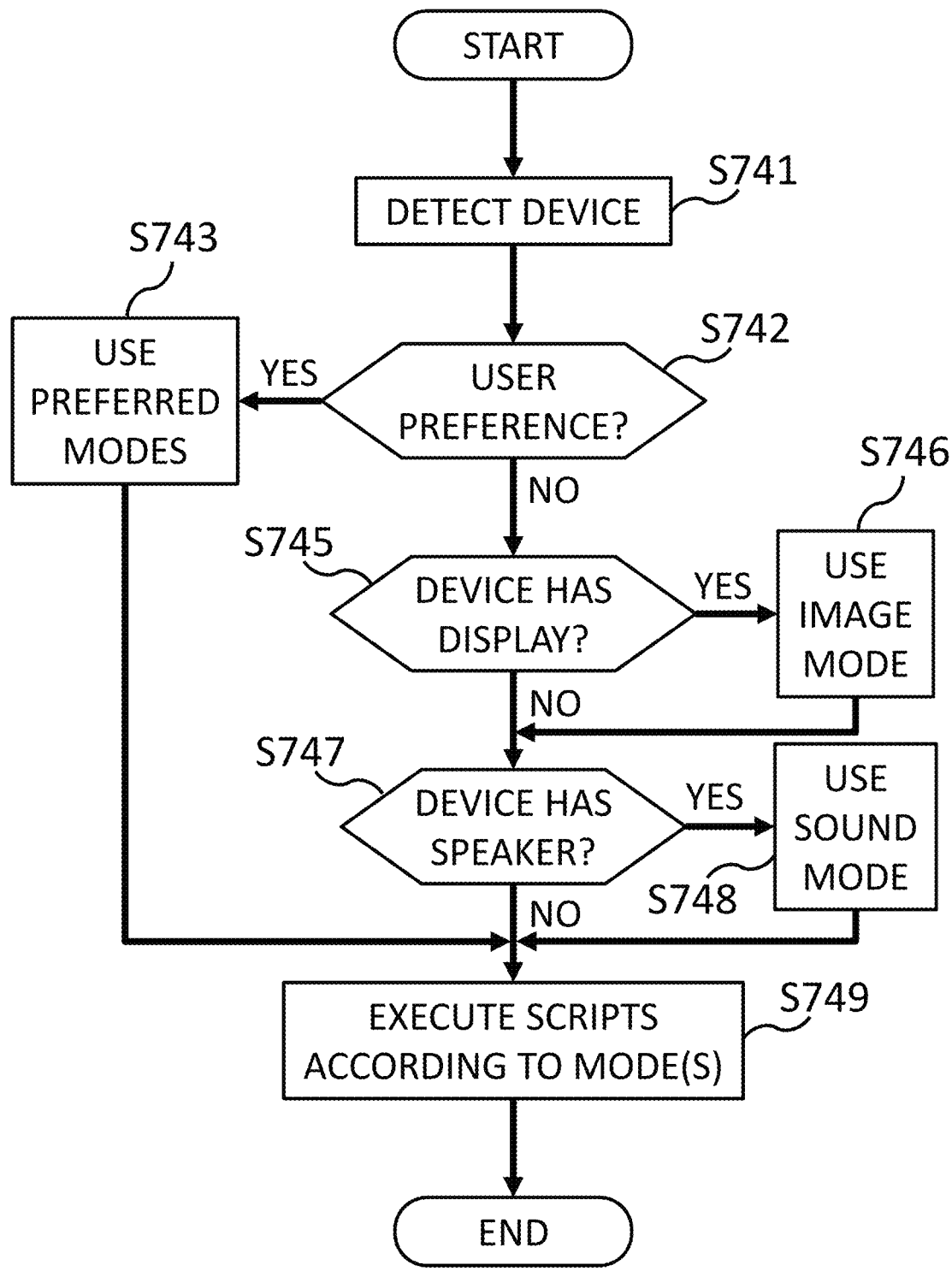
FIG. 7 is an operational flow for rendering concepts, according to at least some embodiments of the present invention.

At S540, a rendering section or a sub-section thereof renders concepts. In at least some embodiments, the rendering section renders the concept of content according to the rendering script and a mode of rendering represented by a rendering device. In at least some embodiments, the rendering section renders the content of the document based on the rendering scripts of individual concepts of the document. In at least some embodiments, the concept rendering proceeds as shown in FIG. 7, which will be explained hereinafter.

FIG. 6 is an operational flow for selecting a script, according to at least some embodiments of the present invention. The operational flow provides a method of selecting a script. In at least some embodiments, one or more operations of the method are performed by a selecting section of an apparatus, such as the apparatus shown in FIG. 9, which will be explained hereinafter.

At S631, the selecting section or a sub-section thereof accesses an associated ontology dataset. In at least some embodiments, the selecting section accesses the ontology dataset associated with an ontology reference from a document. In at least some embodiments with the example document 318 of FIG. 3, the selecting section reads ontology dataset identifier 382 to access the identified ontology dataset of "giraffe.owl" associated with "http://render-scripts.org/southern-giraffe". In at least some embodiments, the document does not identify a specific ontology dataset, and the selecting section accesses a default ontology dataset. In at least some embodiments, the ontology reference functions as both a representation of an entry in an ontology dataset and a location of a rendering script, which means accessing the ontology dataset is unnecessary as long as the rendering script is available and valid.

At S633, the selecting section or a sub-section thereof determines whether the ontology dataset includes an available and valid rendering script associated with the ontology reference from the document. In at least some embodiments, the ontology reference includes an entry including a location of a rendering script, in which case the selecting is further based on an ontology dataset identified by the ontology dataset identifier. In at least some embodiments, the location is indicated in the ontology dataset corresponding to a class entry associated with the ontology reference. In at least some embodiments, the selecting section verifies whether the associated rendering script is available and valid by accessing the location of the rendering script. If the selecting section determines that the ontology dataset includes an available and valid rendering script associated with the ontology reference from the document, then the operational flow proceeds to select the available script (S639), and then the operational flow ends. If the selecting section determines that the ontology dataset does not include an available and valid rendering script associated with the ontology reference from the document, then the operational flow proceeds to higher-level class presence determination at S635. In at least some embodiments with the example ontology dataset 415 of FIG. 4A, the selecting section determines whether the location of "http://render-scripts.org/southern-giraffe", which is associated with ontology reference 380A of document 318 of FIG. 3 in ontology dataset 415, leads to an available and valid rendering script.

At S635, the selecting section or a sub-section thereof determines whether a higher-level class is present in the ontology dataset. In at least some embodiments, the selecting section reads an entry associated with the ontology reference in the ontology dataset for higher-level information, then determines whether the ontology dataset includes an entry associated with the higher-level class. If the selecting section determines that a higher-level class is present in the ontology dataset, then the operational flow returns to associated script availability determination at S633. If the selecting section determines that a higher-level class is not present in the ontology dataset, then the operational flow proceeds to higher-level ontology dataset accessing at S637.

At S637, a selecting section or a sub-section thereof accesses a higher-level ontology dataset. In at least some embodiments, the selecting section accesses a higher-level ontology dataset identified in the current ontology dataset. In the example of FIG. 4A, specialized ontology dataset 415A includes ontology dataset identifier 483, which identifies general ontology dataset 415B of FIG. 4B. In at least some embodiments, the selecting section accesses a default general ontology dataset, such as when the current ontology dataset does not include an ontology dataset identifier of a higher-level ontology dataset. Once the operation at S637 is performed, the operational flow returns to associated script availability at S633 to begin another iteration by determining whether the higher-level ontology dataset includes a rendering script associated with the higher-level class.

FIG. 7 is an operational flow for rendering concepts, according to at least some embodiments of the present invention. The operational flow provides a method of rendering concepts. In at least some embodiments, one or more operations of the method are performed by a detecting section and a rendering section of an apparatus, such as the apparatus shown in FIG. 9, which will be explained hereinafter.

At S741, the detecting section or a sub-section thereof detects the rendering device. In at least some embodiments, the detecting section detects modes of output supported by the rendering device. In at least some embodiments, the rendering device is integrated with the apparatus, and the detecting section detects output components of the apparatus or information descriptive thereof. In at least some embodiments, the detecting section detects the mode of rendering represented by the rendering device. In at least some embodiments, the mode of rendering includes at least one of text, image, and sound. In at least some embodiments, the detecting section detects a first mode and a second mode.

At S742, the detecting section or a sub-section thereof determines whether the rendering device is associated with a user preference. In at least some embodiments, the detecting section communicates with the rendering device to determine whether there is an indication of a preferred mode of rendering. In at least some embodiments, the rendering device is integrated with the apparatus, and the detecting section reads an internal memory bank for an indication of a user preference. If the detecting section or a sub-section thereof determines that the rendering device is associated with a user preference, then the rendering section determines to use the one or more preferred modes of rendering at S743, and proceeds to script execution at S749. If the detecting section or a sub-section thereof determines that the rendering device is not associated with a user preference, then the operational flow proceeds to display detection at S745.

At S745, the detecting section or a sub-section thereof detects a display. In at least some embodiments, the detecting section detects whether the rendering device is capable of text and image modes of rendering. If the detecting section detects a display, then the rendering section determines to use at least an image mode of rendering at S746, and proceeds to speaker detection at S747.

At S747, the detecting section or a sub-section thereof detects a speaker. In at least some embodiments, the detecting section detects whether the rendering device is capable of sound modes of rendering. If the detecting section detects a speaker, then the rendering section determines to use a sound mode of rendering at S748, and proceeds to script execution at S749. In at least some embodiments, the operations before S749 are performed as a matter of pre-processing, such that the result is stored for later use.

At S749, the rendering section executes the rendering scripts according to the modes determined by the rendering section. In at least some embodiments, the rendering section executes the rendering script to render the concept of content according to the first mode and the second mode. In at least some embodiments, the rendering section executes the scripts retrieved at each iteration of S522 of FIG. 5. In at least some embodiments, the rendering section reads stored results of the modes determined by the rendering section. In at least some embodiments, the operations before S749 are also performed as part of executing the rendering scripts. In at least some embodiments, the rendering section executes operating system level instructions in order to render the content of the document. In at least some embodiments, the rendering section converts encoded audio or video data into electronic signals, and transmits the electronic signals to the rendering device. In at least some embodiments with the example document 318 of FIG. 3, the rendering section executes the rendering scripts identified by the data in ontology dataset 415A of FIG. 4A or ontology dataset 415B of FIG. 4B, depending on which rendering script is available and valid, to cause the rendering device to display a representation of a southern giraffe and a northern giraffe.

In at least some embodiments, each rendering script has limited modes of rendering, and do not include the preferred or capable modes of rendering supported by the rendering device. In at least some embodiments, the rendering section accounts for limitations in modes of rendering by utilizing possible modes by preference or capability, and utilizing alternative modes in the absence of preferred modes. In at least some embodiments, the rendering device has many more modes of output, such as modes of scent, touch, taste, or any combination thereof. In at least some embodiments, the rendering device includes different hardware for producing output of one or more modes.

Figure 8:
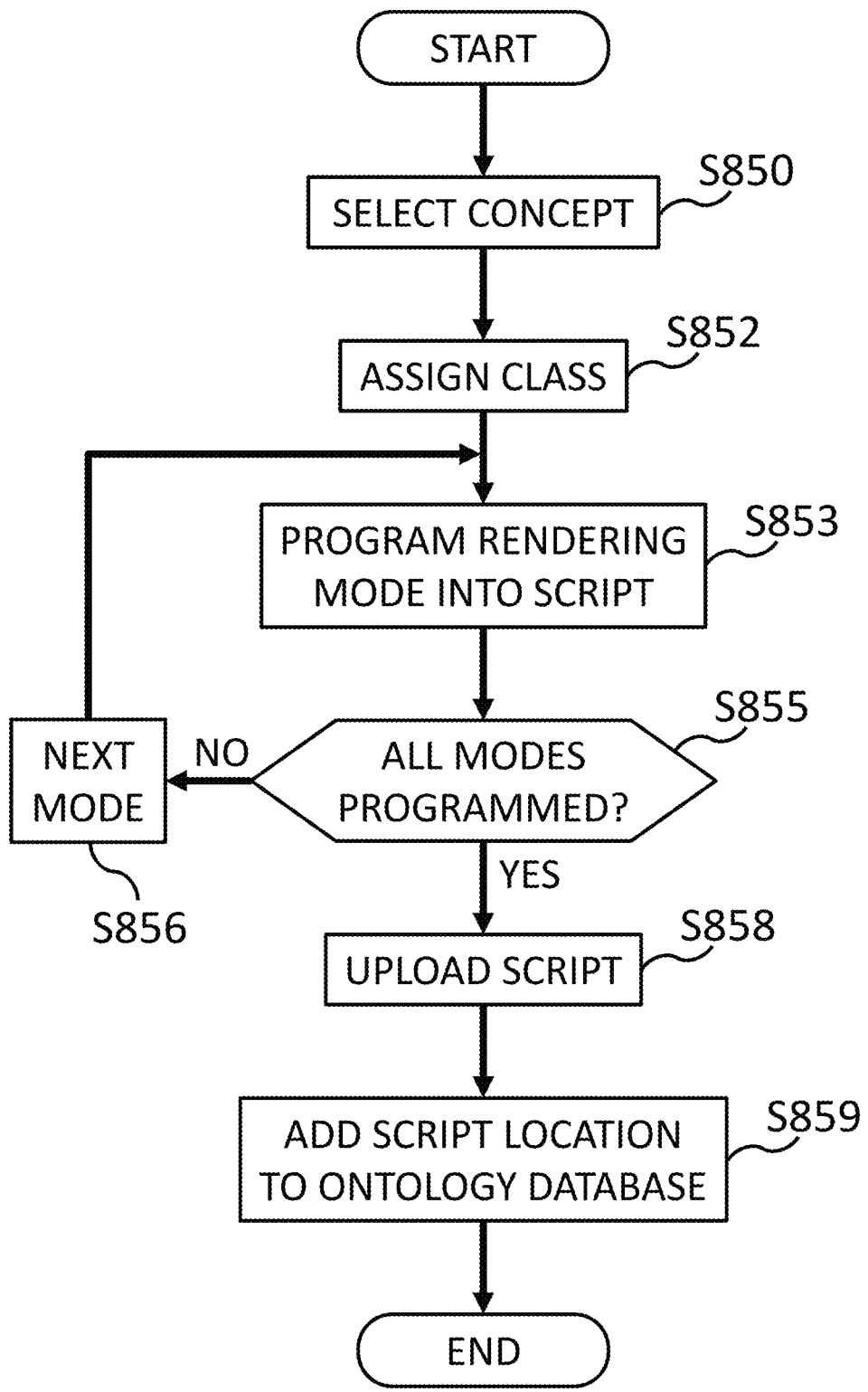
FIG. 8 is an operational flow for creating a rendering script, according to at least some embodiments of the present invention.

FIG. 8 is an operational flow for creating a rendering script, according to at least some embodiments of the present invention. The operational flow provides a method of creating a rendering script. In at least some embodiments, one or more operations of the method are performed by a script generator, such as script generator 110 of FIG. 1. In at least some embodiments, the script generator includes a controller for performing operations. In at least some embodiments, the controller responds to user input to perform the operations of script generation.

At S850, the script generator selects a concept for rendering script creation. In at least some embodiments with the example general ontology dataset 415B of FIG. 4B, the script generator or a user thereof selects the concept of southern giraffe for rendering script creation because there is no entry specific to the concept of southern giraffe in general ontology dataset 415B of FIG. 4B.

At S852, the script generator assigns a class to the concept. In at least some embodiments, the script generator creates a new class to assign to the concept. In at least some embodiments, the script generator assigns an existing class to the concept. In at least some embodiments with the example specialized ontology dataset 415A of FIG. 4A, the script generator or a user thereof assigns subclass 481A to the concept of southern giraffe.

At S853, the script generator programs a rendering mode into the rendering script. In at least some embodiments, the script generator compiles user-generated code into machine language. In at least some embodiments, the script generator maintains the code in structured format for the script. In at least some embodiments, the script generator compresses audio or video data into a compressed format for the rendering script. In at least some embodiments, as iterations of the operation at S853 proceed, the script generator programs a plurality of rendering modes into the rendering script. In at least some embodiments, the script generator creates an autonomous custom element, an HTML Template, a Cascading Style Sheets (CSS) scoping or encapsulation, and a JAVASCRIPT module that can embed the autonomous custom element along with the HTML Template and CSS Scoping to the Document Object Model (DOM) context.

At S855, the script generator determines whether all modes of rendering have been programmed. If the script generator determines that all modes of rendering have been programmed, then the operational flow proceeds to script uploading at S858. If the script generator determines that there are modes remaining to be programmed, then the next rendering mode is selected at S856, and the operational flow returns to rendering mode programming at S853.

At S858, the script generator uploads the rendering script. In at least some embodiments, the script generator uploads the rendering script to a script server, such as script server 112 of FIG. 1. In at least some embodiments, the script generator stores the rendering script in a publicly or privately accessible network location. In at least some embodiments, the script generator serves the JAVASCRIPT module on the script server or embedded in the target DOM context.

At S859, the script generator adds a script location to an ontology dataset. In at least some embodiments, the script generator adds a new concept or modifies an existing concept in the ontology dataset, such as ontology dataset 114 of FIG. 1, with the location or a reference thereto of the rendering script as uploaded to the script server or as otherwise available. In at least some embodiments, adding the script location to an ontology dataset allows document creators to use an ontology reference to the ontology dataset instead of an ontology reference to specific concepts in the document. In at least some embodiments, the script generator assigns a target vocabulary IRI in the ontology dataset to the JAVASCRIPT module's address so that the JAVASCRIPT module can be loaded from the vocabulary IRI. In at least some embodiments, the script generator modifies the class so that the ontology reference to the class functions as both a representation of an entry in an ontology dataset and a location of a rendering script.

Figure 9:
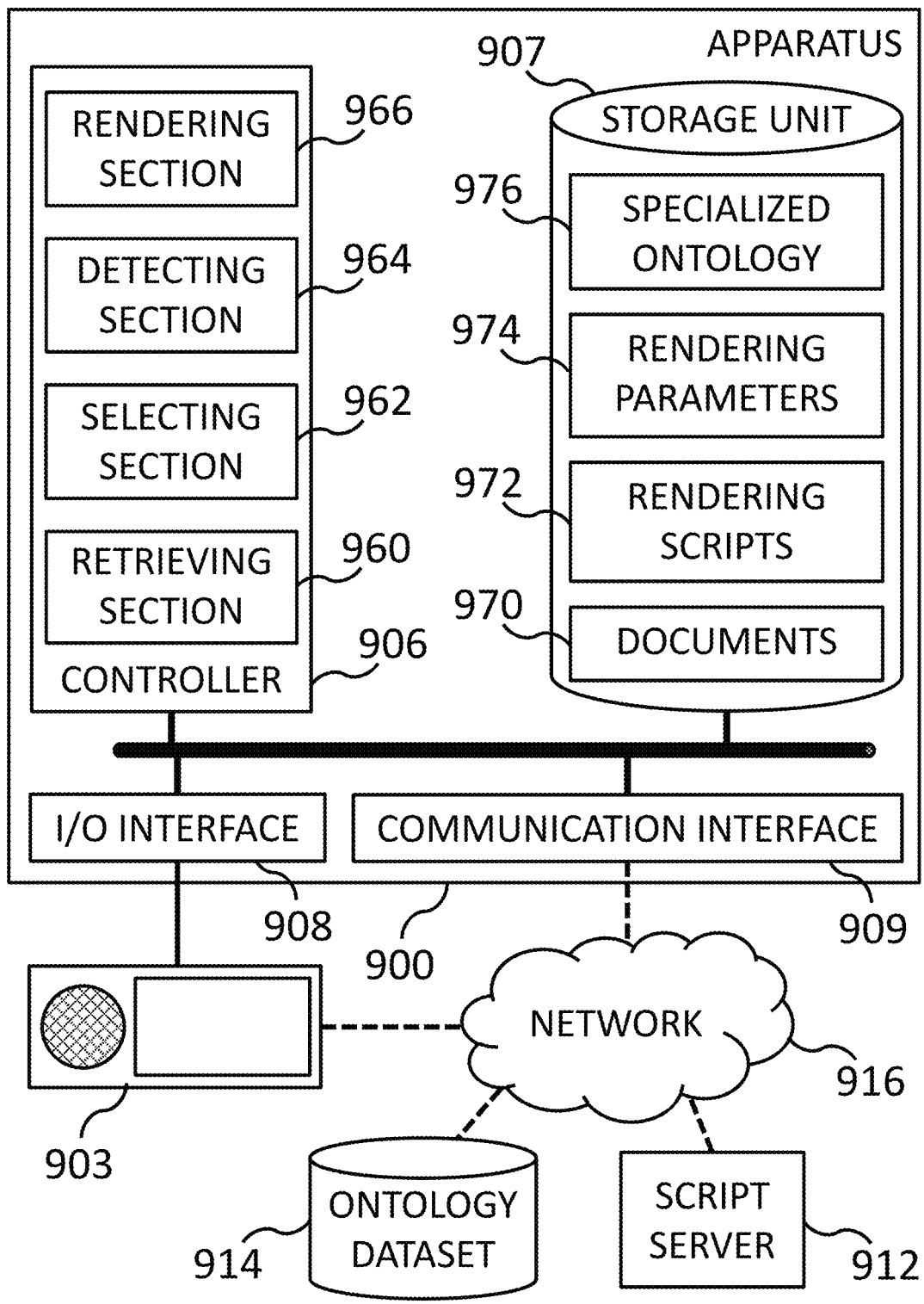
FIG. 9 is a block diagram of a hardware configuration for ontology-based semantic rendering, according to at least some embodiments of the present invention.

FIG. 9 is a block diagram of a hardware configuration for ontology-based semantic rendering, according to at least some embodiments of the present invention.

The exemplary hardware configuration includes apparatus 900, which communicates with script server 912 and ontology dataset 914 through network 916, and interacts with rendering device 903. In at least some embodiments, apparatus 900 is a computer or other computing device that receives input or commands from rendering device 903. In at least some embodiments, apparatus 900 is a host server that connects directly to rendering device 903, or indirectly through network 916. In at least some embodiments, apparatus 900 is a computer system that includes two or more computers. In at least some embodiments, apparatus 900 is a personal computer that executes an application for a user of apparatus 900.

Apparatus 900 includes a controller 906, a storage unit 907, a communication interface 909, and an input/output interface 908. In at least some embodiments, controller 906 includes a processor or programmable circuitry executing instructions to cause the processor or programmable circuitry to perform operations according to the instructions. In at least some embodiments, controller 906 includes analog or digital programmable circuitry, or any combination thereof. In at least some embodiments, controller 906 includes physically separated storage or circuitry that interacts through communication. In at least some embodiments, storage unit 907 includes a non-volatile computer-readable medium capable of storing executable and non-executable data for access by controller 906 during execution of the instructions. Communication interface 909 transmits and receives data from network 916. Input/output interface 908 connects to various input and output units, such as rendering device 903, via a parallel port, a serial port, a keyboard port, a mouse port, a monitor port, and the like to accept commands and present information.

Controller 906 includes retrieving section 960, selecting section 962, detecting section 964, and rendering section 966. Storage unit 907 includes documents 970, rendering scripts 972, rendering parameters 974, and specialized ontology 976.

Retrieving section 960 is the circuitry or instructions of controller 906 configured to retrieve data. In at least some embodiments, retrieving section 960 is configured to retrieve rendering scripts from script server 912, concept information from ontology dataset 914, documents from various locations, etc. In at least some embodiments, retrieving section 960 stores information in storage unit 907, such as documents 970 and rendering scripts 972. In at least some embodiments, retrieving section 960 includes sub-sections for performing additional functions, as described in the foregoing flow charts. In at least some embodiments, such sub-sections is referred to by a name associated with a corresponding function.

Selecting section 962 is the circuitry or instructions of controller 906 configured to select rendering scripts. In at least some embodiments, selecting section 962 is configured to select the rendering script to render the concept of content based on the ontology database identifier and the ontology reference. In at least some embodiments, selecting section 962 utilizes information in storage unit 907, such as documents 970 and specialized ontology 976, and stores information in storage unit 907, such as rendering scripts 972. In at least some embodiments, selecting section 962 includes sub-sections for performing additional functions, as described in the foregoing flow charts. In at least some embodiments, such sub-sections is referred to by a name associated with a corresponding function.

Detecting section 964 is the circuitry or instructions of controller 906 configured to detect rendering modes. In at least some embodiments, detecting section 964 is configured to detect the mode of rendering represented by the rendering device. In at least some embodiments, detecting section 964 utilizes information from storage unit 907, such as documents 970 and rendering parameters 974. In at least some embodiments, detecting section 964 includes sub-sections for performing additional functions, as described in the foregoing flow charts. In at least some embodiments, such sub-sections is referred to by a name associated with a corresponding function.

Rendering section 966 is the circuitry or instructions of controller 906 configured to render content. In at least some embodiments, rendering section 966 is configured to render the concept of content according to the rendering script and a mode of rendering represented by a rendering device. In at least some embodiments, rendering section 966 utilizes information from storage unit 907, such as documents 970, rendering scripts 972, and rendering parameters 974. In at least some embodiments, rendering section 966 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA)

execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, ontology-based semantic rendering is performed by retrieving a rendering script from a location represented by an ontology reference of a concept of content included in a document, the document further including an ontology dataset identifier of the concept and the ontology reference, and rendering the concept of content according to the rendering script and a mode of rendering represented by a rendering device.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a computer to cause the computer to perform operations comprising:
   retrieving a rendering script from a first location identifying an ontology reference of a concept of content included in a document, the document further including an ontology dataset identifier of the concept and the ontology reference, the ontology reference functioning as both an identification of an entry in the ontology dataset and the first location of the rendering script; and
   rendering the concept of content according to the rendering script and a mode of rendering represented by a rendering device;
   wherein the entry in the ontology dataset is retrievable from a second location.

2. The computer-readable medium of claim 1, wherein the rendering includes:
   detecting the mode of rendering represented by the rendering device.

3. The computer-readable medium of claim 2,
   wherein the detecting the mode of rendering represented by the rendering device includes detecting a first mode and a second mode; and
   wherein the rendering includes executing the rendering script to render the concept of content according to the first mode and the second mode.

4. The computer-readable medium of claim 1, wherein the mode of rendering includes at least one of text, image, and sound.

5. The computer-readable medium of claim 1, wherein the operations further comprise:
   selecting the rendering script to render the concept of content based on the ontology database identifier and the ontology reference.

6. The computer-readable medium of claim 5,
   wherein the selecting is further based on an ontology dataset identified by the ontology dataset identifier; and
   wherein the first location is indicated in the ontology dataset corresponding to a class entry associated with the ontology reference.

7. The computer-readable medium of claim 6,
   wherein the ontology dataset identifier represents one of a general ontology dataset and a specialized ontology dataset.

8. A method comprising:
   retrieving a rendering script from a first location identifying an ontology reference of a concept of content included in a document, the document further including an ontology dataset identifier of the concept and the ontology reference, the ontology reference functioning as both an identification of an entry in the ontology dataset and the first location of the rendering script; and
   rendering the concept of content according to the rendering script and a mode of rendering represented by a rendering device;
   wherein the entry in the ontology dataset is retrievable from a second location.

9. The method of claim 8, wherein the rendering includes:
   detecting the mode of rendering represented by the rendering device.

10. The method of claim 9,
    wherein the detecting the mode of rendering represented by the rendering device includes detecting a first mode and a second mode; and
    wherein the rendering includes rendering the rendering script to render the concept of content according to the first mode and the second mode.

11. The method of claim 8, wherein the mode of rendering includes at least one of text, image, and sound.

12. The method of claim 8, further comprising:
    selecting the rendering script to render the concept of content based on the ontology database identifier and the ontology reference.

13. The method of claim 12,
    wherein the selecting is further based on an ontology dataset identified by the ontology dataset identifier; and
    wherein the first location is indicated in the ontology dataset corresponding to a class entry associated with the ontology reference.

14. The method of claim 13, wherein the ontology dataset identifier represents one of a general ontology dataset and a specialized ontology dataset.

15. An apparatus comprising:
a controller including circuitry configured to:
retrieve a rendering script from a first location identifying an ontology reference of a concept of content included in a document, the document further including an ontology dataset identifier of the concept and the ontology reference, the ontology reference functioning as both an identification of an entry in the ontology dataset and the first location of the rendering script; and
render the concept of content according to the rendering script and a mode of rendering represented by a rendering device;
wherein the entry in the ontology dataset is retrievable from a second location.

16. The apparatus of claim 15, wherein the circuitry is further configured to:
detect the mode of rendering represented by the rendering device.

17. The apparatus of claim 16, wherein the circuitry is further configured to:
detect a first mode and a second mode; and
render the rendering script to render the concept of content according to the first mode and the second mode.

18. The apparatus of claim 15, wherein the mode of rendering includes at least one of text, image, and sound.

19. The apparatus of claim 15, wherein the circuitry is further configured to:
select the rendering script to render the concept of content based on the ontology database identifier and the ontology reference.

20. The apparatus of claim 19, wherein the circuitry is further configured to:
select the rendering script based on an ontology dataset identified by the ontology dataset identifier; and
wherein the first location is indicated in the ontology dataset corresponding to a class entry associated with the ontology reference.

\* \* \* \* \*